United States Patent

[11] 3,595,398

| [72] | Inventor | Donald J. Cook |
| | | Barrington, R.I. |
| [21] | Appl. No. | 874,124 |
| [22] | Filed | Nov. 5, 1969 |
| [45] | Patented | July 27, 1971 |
| [73] | Assignee | Fram Corporation |
| | | East Providence, R.I. |

[54] FILTER ASSEMBLY HAVING A REPLACEABLE FILTER ELEMENT
9 Claims, 4 Drawing Figs.

[52] U.S. Cl. ............................................. 210/232, 210/462
[51] Int. Cl. .................................................. B01d 27/08
[50] Field of Search ............................................. 210/232, 447, 441, 460, 462

[56] References Cited
UNITED STATES PATENTS

| 2,689,048 | 9/1954 | Powers | 210/494 X |
| 3,016,984 | 1/1962 | Getzin | 210/232 UX |
| 3,498,464 | 3/1970 | Frosolone | 210/493 X |

FOREIGN PATENTS

| 764,457 | 12/1956 | Great Britain | 210/232 |
| 883,426 | 11/1961 | Great Britain | 210/232 |

Primary Examiner—Samih N. Zaharna
Attorney—W. R. Hulbert

ABSTRACT: Filter assembly in which filter element is installed through opening in side of housing, and a seal between an end of the filter element and the adjacent housing wall prevents fluid from bypassing the filter element.

PATENTED JUL 27 1971

FILTER ASSEMBLY HAVING A REPLACEABLE FILTER ELEMENT

This invention relates to filtering with a replaceable annular filter element counted in a housing.

Objects of the invention are to permit rapid and convenient replacement of the filter element even when the ends of the housing cannot be reached, while ensuring that the filter cartridge is held firmly in place during use of the filter, all with minimum cost and complexity.

The invention features an annular filter element with inlet and outlet portions, a housing having a inlet communicating with the inlet portion of the filter element and an outlet communicating with the outlet portion, a seal between the element and the housing at one end of the element and an outlet communicating with the outlet portion, a seal between the element and the housing at one end of the element to prevent flow between inlet and outlet portions bypassing the element, an opening in the lateral wall of the housing spaced from the element axis when the element is installed, the opening being sized to permit removal of the element by movement perpendicular to the element axis, and a door for the opening. In preferred embodiments a member determines the axial position of the element in the housing, the member and the element having at least two relative positions spaced in a direction transverse to the axis, such that in those two positions the element has two spaced corresponding axial positions in only one of which the seal is operative; the housing has a fixed base formed with an annular depression in which are three ramps, each comprising a slanted portion and a raised flat portion; the member is a clamp ring, adapted to fit into the annular depression, and also having three ramps, each comprising a bottom ridge, a slanted portion, and a support ridge; the clamp ring further has a positioning tab that fits into either of two notches in the housing base, corresponding to two angularly spaced positions of the clamp ring; and the ring ramps mate against the base ramps in either of two ways, locating the filter element in either of two axial positions, the first permitting the element to be inserted or removed, while in the second the element is held firmly in place within the housing against the seal.

Other objects, features and advantages will appear from the following description of a preferred embodiment of the invention, taken together with the attached drawings thereof, in which.

Figure 1:
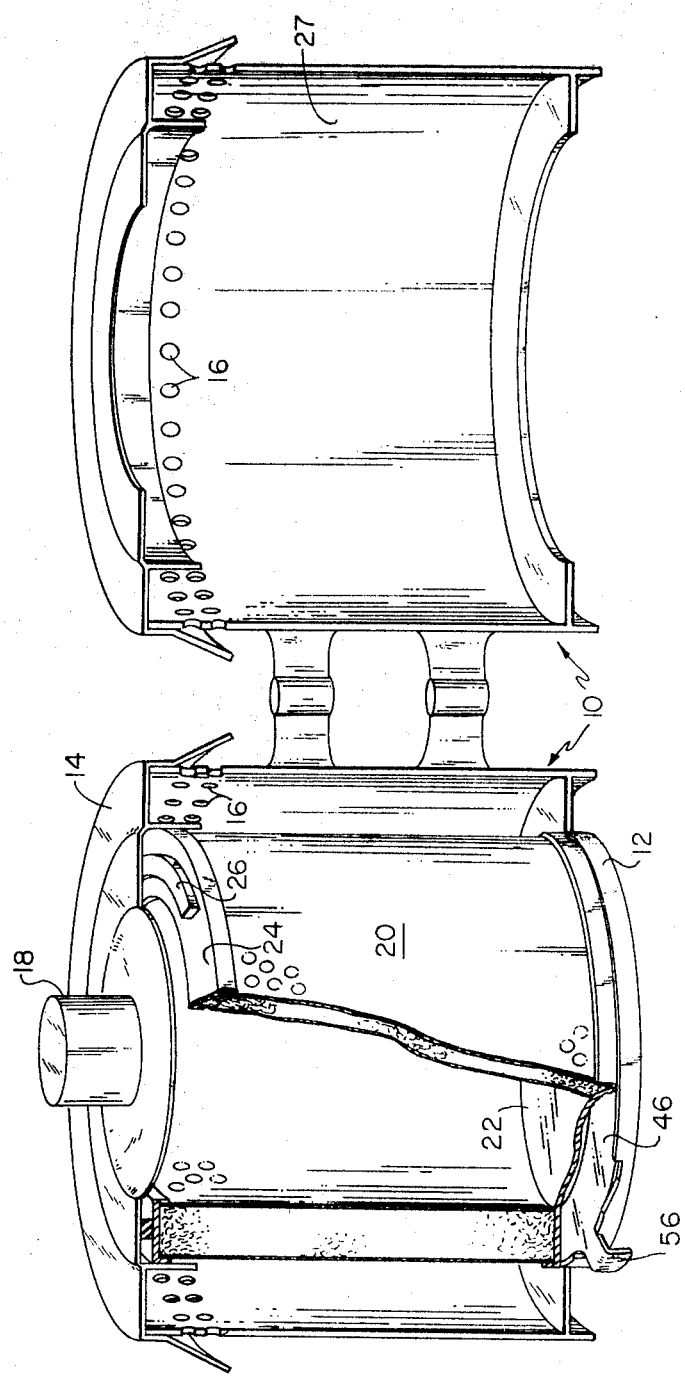
FIG. 1 is a perspective view of the housing, partially cut and broken away to show the filter element.

Referring to FIG. 1, filter housing 10 has a fixed base 12 and a top 14, inlets 16, and outlet 18, and contains a filter element 20 with a closed bottom end cap 22, and a top end cap 24. A sealing gasket 26 is mounted on end cap 24.

Figure 2:
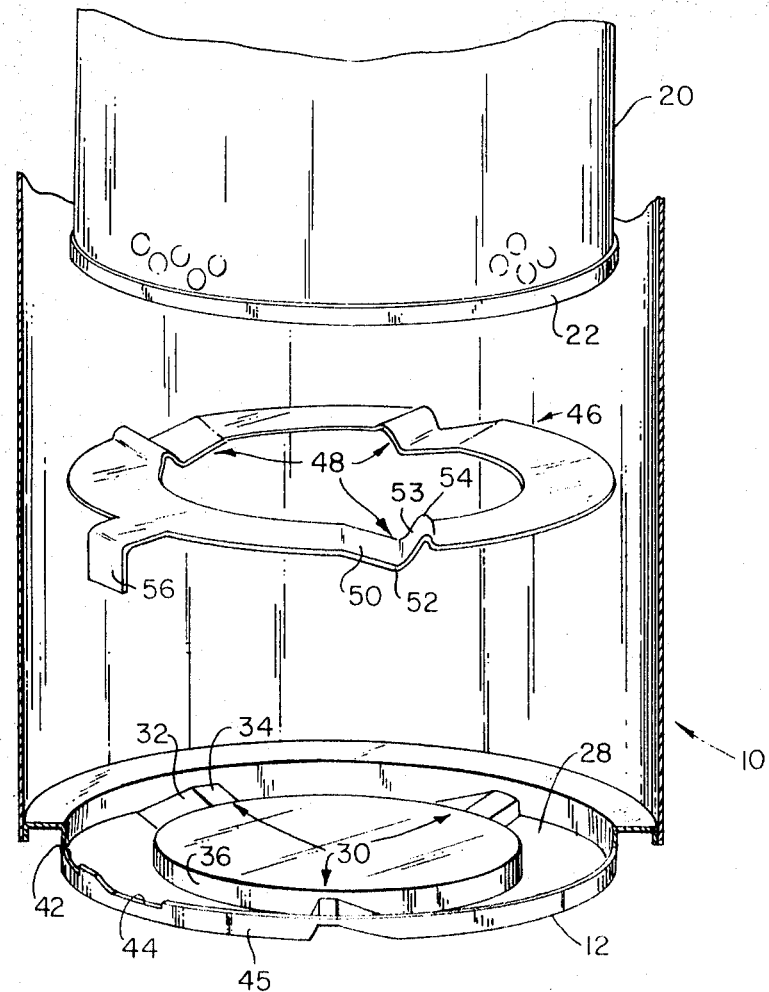
FIG. 2 is an exploded and partially cutaway fragmentary perspective view of the housing and element, showing the housing base and clamp ring.

The housing (except for base 12) is split and hinged to provide a door 27. Housing base 12 (referring now to FIG. 2) is formed with an annular depression 28, of outer diameter slightly larger than that of filter end cap 22. Depression 28 contains three base ramps 30, equidistant from each other. Each ramp 30 includes a 30° inclined section 32, and a flat section 34 slightly lower than the top of the inner wall 36 of depression 28. Notches 42 and 44 are provided in housing flange 45 bordering recess 28.

Disposed in recess 28 is generally annular clamp ring 46, formed with three ramps 48 corresponding to ramps 30 in base 12. Each ramp 48 includes a 30° inclined portion 50, a bottom ridge 52, and a sharply inclined portion 53 terminating in a support ridge 54, raised slightly above the general plane of the ring. Tab 56 projects from the outer edge of the ring.

Figure 3:
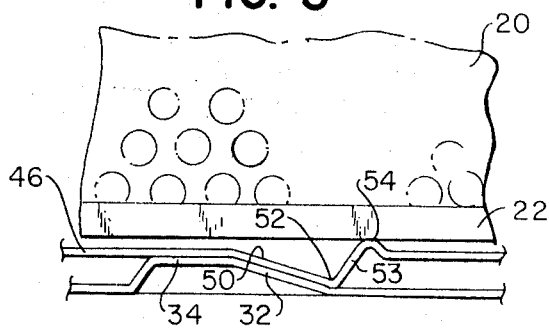
FIG. 3 is a cross section of a pair of mating ramps in unloaded position.
Figure 4:
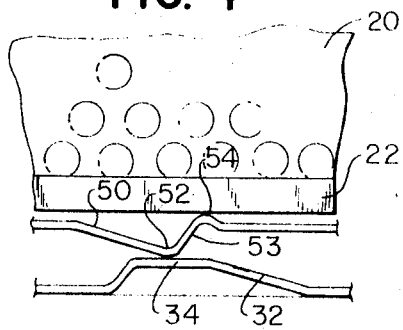
FIG. 4 shows the ramps of FIG. 3 in loaded position.

To load a filter element into housing 10, with door 27 open, tab 56 is placed in notch 44. In this angular position of clamp ring 46, each slanted ring portion 50 is directly over a corresponding slanted base portion 32, as shown in FIG. 3. Filter element 20 is then moved laterally into the open housing and placed on ring 46, end cap 22 of the element resting on support ridges 54 of the clamp ring, and gasket 26 out of contact with housing top 14. Tab 56 is then moved to notch 42, rotating ring 46, which causes each ring portion 50 to slide up matching base portion 32 until each bottom ridge 52 of the ring rests on a flat section 34 of the base, as shown in FIG. 4. This angular motion of the clamp ring in turn produces an axial motion of element 20 toward the top of the housing, and forces gasket 26 against top 14, thus holding element 20 securely in place, and preventing flow from bypassing the element. Door 27 is then closed.

Other embodiments will occur to those skilled in the art and are within the following claims.

What I claim is:

1. A filter assembly, comprising
a filter element with inlet and outlet portions,
a housing having
a pair of end walls,
a lateral wall extending between said end walls, and
an inlet and an outlet respectively in communication with said inlet and outlet portions when said filter is secured in said housing, and
a seal member disposed between one end of said filter element and the adjacent said end wall of said housing,
said filter element being movable in a direction having at least a component axial of said housing, to cause said seal member to provide an effective seal between said end of said element and said adjacent end wall to prevent fluid flow through said assembly from bypassing said filter element,
said housing having
an opening in said lateral wall to admit said filter element,
a door for said opening, and
means including a second member adjacent the other end of said element constructed and arranged to control the axial position of said filter element, at least one of said second member and said element being arranged for movement relative to each other transverse to the axis of said housing to cause said seal member to provide said effective seal.

2. The assembly of claim 1 wherein said second member is movable.

3. The assembly of 2 wherein said second member is an annular clamping ring between the base of said housing and said element, and said ring is movable between positions spaced angularly with respect to said axis.

4. The assembly of claim 3 wherein said ring includes ramps arranged to mate with corresponding ramps of the base of said housing in one of the angularly spaced positions, the corresponding pairs of ramps being unmated in the other of said angularly spaced positions, forcing said ring and said element axially away from said base and forcing said seal into sealing relationship with said end and said adjacent end wall.

5. The assembly of claim 4 wherein each said ramp of said base includes an inclined portion and a flat portion; and each said ramp of said ring includes a first inclined portion of slope equal to said inclined portion of said base, and a second inclined portion between upper and lower ridges respectively contacting said base and said element.

6. The assembly of claim 5 wherein said second inclined portion has a slope steeper than that of said first inclined portion.

7. The assembly of claim 3 wherein said base has a cylindrical flange with a pair of notches, sand ring has a tab which cooperates with said notches to fix said ring in its respective said positions.

8. The assembly of claim 7 wherein said housing, except for said base, is split and hinged to form said opening and said door.

9. The assembly of claim 4 wherein said ramps are in a recess in said base and terminate below a sidewall of said recess.